Jan. 4, 1949.  J. SHAW  2,458,106

COMBINATION SEAL, DRIP TUBE, AND DISPENSING UNIT

Filed June 3, 1947

Inventor.
John Shaw.
by McKnight and Corswick
Attorneys

Patented Jan. 4, 1949

2,458,106

UNITED STATES PATENT OFFICE 2,458,106

COMBINATION SEAL, DRIP TUBE, AND DISPENSING UNIT

John Shaw, Chicago, Ill.

Application June 3, 1947, Serial No. 752,114

4 Claims. (Cl. 128—214)

This invention relates to a unit adapted to seal a bottle containing liquid, and when desired to provide air to said bottle so that the liquid therein may be dispensed, and in the same combination to supply the features and advantages of a visible drip tube.

It is among the objects of my invention to provide a unit which may readily be attached to a container containing liquid, to seal the container, said unit having means for providing air for the bottle to displace the liquid therein and permit the liquid to flow therefrom. Another object is to so construct my unit that it also functions as a visible drip tube.

My invention also contemplates such other objects, advantages and capabilities as will later more fully appear and which are inherently possessed by my invention.

While I have shown in the accompanying drawings a preferred form of my invention, yet I wish it understood that the same is susceptible of modification and change without departing from the spirit of my invention.

Figure 1:
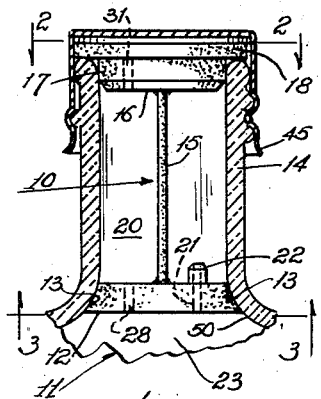
Figure 2:
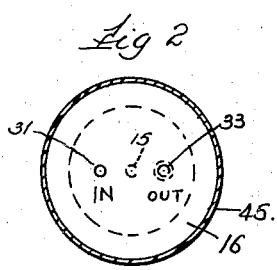
Figure 3:
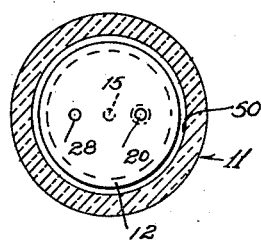
Figure 4:
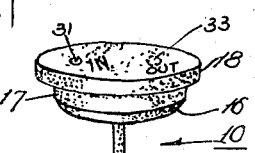
Figure 5:
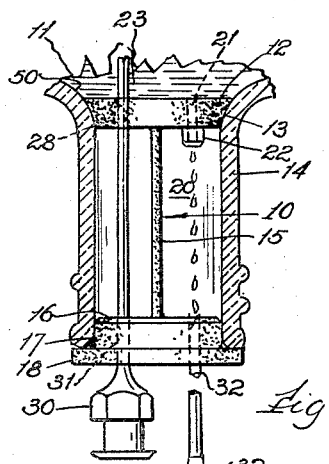
Figure 6:
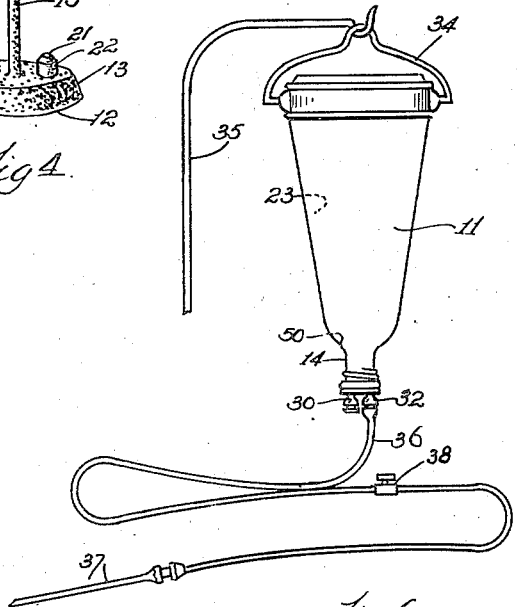
Figure 7:
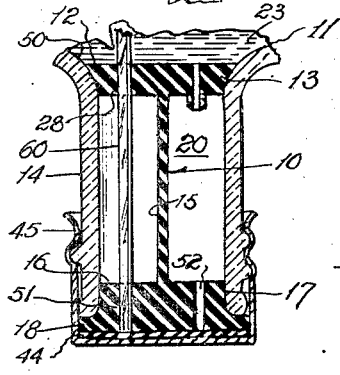

Referring to the drawings, Fig. 1 is a detailed sectional view of my unit in sealed position on a container; Fig. 2 is a sectional view on line 2—2 of Fig. 1; Fig. 3 is a sectional view on line 3—3 of Fig. 1; Fig. 4 is a perspective view of my device; Fig. 5 is a detailed sectional view of my device on a container, in use; Fig. 6 is an elevational view of the complete apparatus; and Fig. 7 is a detailed sectional view of another embodiment.

The embodiment selected to illustrate my invention comprises a body member 10 made of rubber or other suitable material, adapted to be attached to a transparent bottle or other suitable container 11 containing sterile liquid to be dispensed for parenteral injection. The body member 10 has a bottom 12 with wedge shaped side walls 13. Extending upwardly and integrally from the bottom 12 is a stretchable cord 15, which extends to integral top portion 16. Top portion 16 has side walls 17 and an over-hanging flange 18. The side walls 17 engage the walls 14 within container 11 and flange 18 rests on top of side walls 14.

The walls 14 have an inwardly curved portion 50 just below the neck of container 11. Cord 15 is of such a length as to permit walls 13 of bottom 12 to engage the upper narrowing portion of curved portion 50. Cord 15 is also slightly shorter in normal length than the distance between the contact point of walls 13 with curved portion 50, and the engagement of flange 18 on top of walls 14. This forces cord 15 to be stretched for said contacts, thereby providing a sealing engagement of walls 13 with curved portion 50 and flange 18 on top of walls 14. The force set up by the stretching of cord 15 maintains the seal at both ends.

The curved portion 50 varies slightly as container manufacturers will not guarantee a definite tolerance. Cord 15 being stretchable permits walls 13 to be moved to that part of curved portion 50 which it can engage for a seal. In this way accommodation for slight variations in curved portion 50 is provided.

Cord 15 being substantially smaller in diameter than bottom 12 and top 16 leaves space therebetween and with the neck portion of container 11 forms liquid flow chamber 20.

Bottom 12 has an air opening 28 therethrough, providing communication with the interior 23 of container 11. Spaced from opening 28 in bottom 12 is a liquid flow opening 21 extending therethrough and through tip 22.

At the laboratory, my container 11 is filled with suitable solution, and the body member 10 is placed in position in container 11 as heretofore set forth.

When a parenteral injection is about to be given, a needle 30 is placed on the spot 31 on top portion 16, suitably marked "In," or the like. This spot 31 is directly above the air inlet opening 28. Air from the atmosphere is thereby provided needle 30, through opening 28 to the interior 23 of container 11.

Another needle 32 is placed on spot 33 on top portion 16, suitably marked "Out," or the like. This spot 33 is directly above liquid flow chamber 20. The needle 32 is then pushed through top portion 16 into liquid flow chamber 20, providing communication between needle 32, liquid flow chamber 20, and by opening 21 with the interior 23 of container 11.

The bottle is then inverted and its swingable bale 34 is placed on standard 35. To needle 32 is attached suitable tubing 36 and attached at the opposite end for a parenteral injection is injection needle 37.

Air coming from the atmosphere passes through air needle 30 and thus into the interior 23 of container 11. This permits flow of the liquid in container 11 down through liquid opening 21 and tip 22 to liquid flow chamber 20. As the liquid drips from tip 22, into liquid flow chamber 20, its dropping, or rate of flow, is visible through transparent wall 14. The liquid passes downwardly through liquid flow chamber 20 into needle 32, through tubing 36 and needle 37 into the patient. A clamp 38 is attached to tubing 36 for regulation of the flow of the liquid.

A variation of my preferred embodiment is to provide top member 16 with an air inlet opening 51 and/or a liquid outlet opening 52, each extending therethrough. A covering 44 is provided to keep either or both of these openings closed and sanitary. The covering 44 is sealed in position by a removable closure 45 attached to the neck of the container 11. Upon the removal of covering 44 and closure 45, said opening 52 would be accessible to receive suitable connection with tube 36.

In this embodiment, a glass tube 60 extends through air inlet opening 51 and continues through air opening 28 down to a lower portion of the interior 23 of container 11.

In the embodiment shown in Fig. 5, instead of my long needle 30, a glass tube 60 similar to that shown in Fig. 6 may be positioned in body member 10 with one end part way through air inlet 31 and the tube 60 extending through air opening 28 down to a lower portion of the interior of container 11. A shorter needle 30 may then be positioned in tube 60 by puncturing through air inlet 31.

Having thus described my invention, I claim:

1. In combination with a container having a hollow interior with liquid therein, a transparent neck and an inwardly curved gradually reduced portion connecting the interior with the neck, a body member having spaced top and bottom portions and a stretchable connecting portion therebetween, said connecting portion substantially smaller in diameter than said top and bottom portions leaving a space therebetween to form with the transparent neck a liquid flow chamber, the bottom portion of said body member being slightly larger in diameter than the diameter of the upper part of the curved portion of the container, and adapted to seal therewith, the connecting portion of said body member being normally slightly less than the distance between the top of the neck of the container and the inwardly curved portion, said connecting portion stretchable so that said top portion engages the top of the neck of the container, said bottom portion having a liquid flow opening and an air hole corresponding therethrough, said top portion adapted to be pierced by a needle for supplying air from the atmosphere, said top portion also adapted to be pierced by a needle extending within the liquid flow chamber for receiving liquid from said container, said bottom portion having a hollow integral tip extending within said liquid flow chamber and communicating with the opening in said bottom portion so that when the container is inverted the flow of liquid from said tip is visible through the transparent wall of the neck of said container.

2. In combination with a container having a hollow interior with liquid therein, a transparent neck and an inwardly curved gradually reduced portion connecting the interior with the neck, a body member having spaced top and bottom portions and a stretchable connecting portion therebetween, said connecting portion substantially smaller in diameter than said top and bottom portions leaving a space therebetween to form with the transparent neck a liquid flow chamber, the bottom portion of said body member being slightly larger in diameter than the diameter of the upper part of the curved portion of the container, and adapted to seal therewith, the connecting portion of said body member being normally slightly less than the distance between the top of the neck of the container and the inwardly curved portion, said connecting portion stretchable so that said top portion engages the top of the neck of the container, said bottom portion having an opening therethrough providing communication with the interior of the container, said body member having an air passage communicating with the interior of the container, means for sealing the top of said air passage, said means and said air passage adapted so that said air passage may be reached by an air supply, said top member adapted to permit communication with said liquid flow chamber.

3. In combination with a container having a hollow interior with liquid therein, a transparent neck and an inwardly curved gradually reduced portion connecting the interior with the neck, a body member having spaced top and bottom portions and a stretchable connecting portion therebetween, said connecting portion substantially smaller in diameter than said top and bottom portions leaving a space therebetween to form with the transparent neck a liquid flow chamber, the bottom portion of said body member being slightly larger in diameter than the diameter of the upper part of the curved portion of the container, and adapted to seal therewith, the connecting portion of said body member being normally slightly less than the ditsance between the top of the neck of the container and the inwardly curved portion, said connecting portion stretchable so that said top portion engages the top of the neck of the container, said bottom portion having means to permit passage of air and liquid therethrough, said upper portion having air and liquid passages, and a removable cover for sealing said passages.

4. In combination with a container having a hollow interior with liquid therein, a transparent neck and an inwardly curved gradually reduced portion connecting the interior with the neck, a body member having spaced top and bottom portions and a stretchable connecting portion therebetween, said connecting portion substantially smaller in diameter than said top and bottom portions leaving a space therebetween to form with the transparent neck a liquid flow chamber, the bottom portion of said body member being slightly larger in diameter than the diameter of the upper part of the curved portion of the container, and adapted to seal therewith, the connecting portion of said body member being normally slightly less than the distance between the top of the neck of the container and the inwardly curved portion, said connecting portion stretchable so that said top portion engages the top of the neck of the container, said body member having an opening permitting communication between said liquid flow chamber and said container, means for supplying air through said body member to said container, and means permitting communication with said liquid flow chamber to permit flow of liquid from said container.

JOHN SHAW.

REFERENCES CITED

The following references are of record in the file of this patent:

UNITED STATES PATENTS

| Number | Name | Date |
| --- | --- | --- |
| 2,426,733 | Gee | Sept. 2, 1947 |
| 2,433,242 | Shaw | Dec. 23, 1947 |